United States Patent

Taylor, Jr.

[15] 3,697,567
[45] Oct. 10, 1972

[54] REMOVAL OF DISSOLVED ORGANIC LEAD FROM AQUEOUS ALKYLLEAD PROCESS EFFLUENTS

[72] Inventor: Earl Richard Taylor, Jr., Antioch, Calif.

[73] Assignee: E. I. du Pont de Nemours and Company, Wilmington, Del.

[22] Filed: March 24, 1971

[21] Appl. No.: 127,844

[52] U.S. Cl. ............... 260/437 R, 210/42, 210/59
[51] Int. Cl. ............................................. C07f 7/24
[58] Field of Search ............. 260/437 R; 210/42, 59

[56] References Cited

UNITED STATES PATENTS

| | | | |
|---|---|---|---|
| 2,270,108 | 1/1942 | Calingaert | 260/437 R |
| 2,270,109 | 1/1942 | Calingaert | 260/437 R |
| 2,400,383 | 5/1946 | Bertolette | 260/437 R |
| 2,513,654 | 7/1950 | Krohn | 260/437 R |
| 2,513,659 | 7/1950 | Madden | 260/437 R |
| 3,113,955 | 12/1963 | Sandy | 260/437 R |
| 3,308,651 | 3/1967 | Collier | 260/437 R |
| 3,457,288 | 7/1969 | Cortez | 260/437 R |
| 3,579,554 | 5/1971 | Boudreau | 260/437 R |

FOREIGN PATENTS OR APPLICATIONS

| | | | |
|---|---|---|---|
| 572,192 | 3/1959 | Canada | 260/437 R |
| 800,609 | 8/1958 | Great Britain | 260/437 R |

Primary Examiner—Tobias E. Levow
Assistant Examiner—H. M. S. Sneed
Attorney—Louis H. Rombach

[57] ABSTRACT

Process of removing dissolved organic lead from an aqueous effluent produced in the manufacture of alkyllead compounds by contacting a metal more electropositive than lead but essentially non-reactive with water with the effluent until the dissolved organic lead is converted to an insoluble lead-containing product, leaving a reduced dissolved organic lead content in the effluent.

7 Claims, No Drawings

REMOVAL OF DISSOLVED ORGANIC LEAD FROM AQUEOUS ALKYLLEAD PROCESS EFFLUENTS

BACKGROUND OF THE INVENTION

1. Field of the Invention

This invention relates to a process for removing dissolved alkyllead compounds from aqueous effluent produced in the manufacture of alkyllead compounds.

2. Description of the Prior Art

Tetraalkyllead antiknock compounds are manufactured commercially by alkylating a lead-sodium alloy with an alkyl chloride, such as ethyl chloride, methyl chloride or a mixture of methyl and ethyl chlorides.

In these processes, after unreacted alkyl chloride has been distilled off, the reaction mass is drowned in water and the tetraalkyllead steam distilled therefrom. The still residue is settled and the solids are further washed with water to remove various lead-containing salts. The water remaining from the still residue and washing steps constitutes waste aqueous effluent from the tetraalkyllead manufacturing process.

The impure tetraalkyl product from the steam distillation is normally aerated in the presence of water as disclosed in U.S. Pat. No. 2,400,383 to remove certain sludge forming impurities. The purified tetraalkyllead is then separated from the aqueous phase. This aqueous phase, containing some soluble alkyllead materials formed in the purification, also constitutes part of the aqueous effluent from the tetraalkyllead process.

Still another aqueous effluent presenting a disposal problem is that produced in the well-known acid-catalyzed redistribution of tetraalkyllead compositions containing at least two different alkyl groups, e.g. methyl and ethyl as in mixtures of tetramethyllead and tetraethyllead. The redistributed tetraalkyllead compositions are water washed, generally with alkali to remove catalyst and water-soluble lead-containing side reaction products.

The aqueous effluents from the above tetraalkyllead processes usually contain both water-soluble inorganic and organic lead compounds. The soluble organic lead content can amount to as much as 10,000 to 30,000 parts per million of dissolved lead.

The disposal of aqueous effluents from tetraalkyllead processes is a serious problem, since the maximum amount of soluble lead compounds allowed in aqueous effluent discharges is limited. Moreover, the disposal of soluble organolead compounds constitutes a significant loss of lead.

The water-soluble inorganic lead compounds in the aqueous effluent do not pose a serious disposal problem since they can be removed by simply adjusting the pH to 8 to 9.5 in the presence of water-soluble carbonates as described in Canadian Pat. No. 572,192. However, the soluble alkyllead compounds in the aqueous effluent, such as trialkyllead chlorides, trialkyllead hydroxides, dialkyllead dichlorides and dialkyllead dihydroxides, cannot be satisfactorily removed by such treatment.

U.S. Pat. No. 3,308,061, to Collier, discloses the removal of soluble organolead compounds in aqueous effluents from the manufacture of alkyllead compounds by treating with ozone at pH 8.0 to 9.5. However, this treatment is expensive. In addition, it has another disadvantage. It destroys the alkyllead values in the effluent.

An object of this invention is to provide a simple, economical and commercially practical process for treating the aqueous effluent from the manufacture of alkyllead so as to reduce the concentration of soluble organic lead compounds therein without introducing other objectionable substances into the effluent.

Another object of this invention is to provide a simple, economical process for recovering the soluble organic lead from the aqueous effluent resulting from the manufacture of alkyllead.

These and other objects will be evident from the specification that follows.

SUMMARY OF THE INVENTION

Now in accordance with the invention, the aqueous effluent from the manufacture of alkyllead compounds containing dissolved organic lead is reduced in soluble organic lead content by the process which comprises:

A. contacting the effluent with a metal more electropositive than lead but essentially non-reactive with water until the dissolved organic lead is converted into an insoluble lead-containing product and B. separating the insoluble lead-containing product from the aqueous effluent. Thus when aqueous effluents from the manufacture of alkyllead compounds containing dissolved organic lead are contacted with a metal selected from the group consisting of iron, zinc, aluminum and magnesium until the dissolved organic lead is converted into an insoluble lead containing compound and the insoluble lead containing compound is separated from the aqueous effluent the dissolved organic lead content thereof is reduced.

This invention is based on the discovery that elemental metals more electropositive than lead but essentially non-reactive with water are highly effective in removing water-soluble organic lead products from waste water of the manufacture of alkyllead compounds. The organic lead products removed from such waste streams constitute valuable recovery products.

This process is useful to lower potential natural water pollution by an aqueous effluent produced in the manufacture of tetraalkyllead antiknock compounds, to remove water-soluble alkyllead compounds available in the effluent and to enable the recovery of water-insoluble alkyllead compounds useful as antiknock agents or precursors thereof. By the process of this invention, the dissolved alkyllead can be removed from the aqueous effluent to such an extent that the aqueous effluent from tetraalkyllead manufacture is substantially reduced in content of dissolved organic lead. The process is easy to operate, and the quantity of materials, the time and intimacy of contact are easily coordinated to reduce the dissolved organic lead content to a low level.

The process of this invention provides a novel process for treating an aqueous effluent from the manufacture of alkyllead compounds, containing at least 500 ppm but usually about 10,000 to 30,000 ppm of lead, as dissolved organic lead, so that the treated effluent contains less than 100 ppm of dissolved organic lead.

The process of the present invention is broadly applicable to the treatment of waste effluents produced in the manufacture of tetraalkyllead compounds, which includes processes involving the alkylation of sodium lead alloys, the electrolytic process of alkylating lead, and redistribution methods for producing mixed tetraalkyllead compounds.

This process is particularly applicable to the treatment of waste effluent from the manufacture of (1) tetraethyllead by the reaction of sodium lead alloy with ethyl chloride, (2) tetramethyllead by the reaction of sodium lead alloy with methyl chloride in the presence of an aluminum halide and (3) mixed methyl and ethyl alkyllead compounds by the redistribution of tetramethyl- and tetra-ethyllead mixtures with Lewis acid catalysts. All of these processes, together with the aeration purification process described above, tend to produce in the aqueous effluent water-soluble organic lead compounds not precipitatable by adjustment of pH to alkaline range, e.g., 8 to 9.5, such as those of the type $R_{4-n}PbX_n$ where R stands for methyl or ethyl, X for halide, such as chloride, or hydroxide, depending on pH of the solution, and n equals 1 or 2.

Ordinarily the aqueous waste water to be treated will contain from about 10,000 to about 30,000 ppm of lead in the form of water-soluble organic lead compounds not precipitatable by pH adjustment. Levels higher than 30,000 ppm of soluble organic lead compounds, when encountered, can also be successfully reduced.

To carry out the process a metal more electropositive than lead is brought into contact with the effluent. The quantity of the metal used is at least the electrochemical equivalent of the dissolved organic and inorganic lead in the effluent. A large excess, as much as ten times the minimal amount, of the metal may be used but it is not necessary. Contact can be made by flowing the effluent past the metal, for instance as a bed of the metal in high surface area form, or, preferably, by agitating the metal in the effluent. Insoluble lead-containing products are formed, which include water-immiscible lead-containing organic liquids and elemental lead derived from both the soluble alkyllead and soluble inorganic lead compounds in the effluent.

The elemental metal used in this process should be more electropositive than lead but essentially non-reactive with water. Such a metal is typified as being in the range from lead to magnesium in the electromotive series as shown on page 283 of Hackh's Chemical Dictionary, Third Edition, the Blakiston company (1953). Examples of metals useful in this process which are more readily available and inexpensive in comparison to others within the above limits include iron, zinc, aluminum and magnesium. Therefore the preferred metals of this invention include iron, zinc, aluminum and magnesium. The most preferred metal is aluminum because it is more readily available and inexpensive, and additionally because its derivatives are relatively non-toxic and it is effective in alkaline media. The metal used need not be pure, the metal used may have impurities which do not interfere with its effectiveness in this process.

The form of the metal should be such that a reactive surface is present. This may be achieved by having a high surface to volume ratio, such as in chopped sheet, foil, shavings, chips, wire or powder form. Chopped sheet and wire forms are preferred for their relative cheapness.

This process can be operated at temperatures over the range of about 20° C. to about 100° C. When operating at the lower end of the temperature range, the dissolved lead is converted chiefly to water-insoluble hexaalkyldilead. At the upper end of this range the hexaalkyldilead gradually forms other water-insoluble products, such as tetraalkyllead, elemental lead and some hydrocarbons. A preferred temperature range for this process is 80°–100° C. because at these temperatures formation of steam-distillable tetraalkyllead occurs rapidly.

This process can be carried out at pH 1 to 14. At the extremities of this range, such as at pH 13 to 14 and at pH 1 to 2, the conversion of the soluble lead to the insoluble lead, though it occurs rapidly, competes with wasteful hydrogen generation by known reactions with the metals used. The pH range 2 to 5 may be used with most metals, such as, for example, iron, zinc, aluminum and magnesium. The pH range 8 to 13 may be used with, for instance, zinc or aluminum and is preferred because of minimal corrosion problems in normally available reaction vessels.

The insoluble lead-containing products formed can be separated from the treated aqueous effluent by conventional methods known in the chemical art, such as by settling, decantation, extraction with a water-immiscible solvent for water-insoluble organic liquids, steam distillation, filtration or combinations of these. The preferred method of separating the lead-containing insoluble organic liquids is steam distillation. The settling of precipitate in the aqueous effluent may be assisted by the use of small amounts of flocculating agents which form flocculant precipitates in alkaline solution. Representative flocculating agents include salts of magnesium, aluminum, chromium, iron and zinc, particularly ferric chloride or aluminum chloride. These flocculating agents are usually added as dilute aqueous solutions with agitation, ordinarily in the proportion of about 20 to 60 ppm of the effluent.

A preferred embodiment of this process involves the use of aluminum foil or aluminum wire with an agitated aqueous effluent which is initially alkaline (pH 8 to 13), or made so by the appropriate addition of an alkali metal hydroxide or of an alkali metal salt of a weak base, such as sodium silicate, potassium carbonate or trisodium phosphate. In anticipation of extended steam temperatures organic liquids which stabilize tetraalkyllead compounds may be added. The effluent mixture is heated by any suitable means, preferably by dry steam injection, to the desired reaction temperature. Conversion of the soluble organic lead compounds to water-insoluble lead forms is usually complete before the process mass reaches a distillation temperature.

Steam distillation, which is merely one of the means of separating the insoluble organic lead compounds from the effluent, reduces the soluble lead content of aqueous effluent to 100–400 ppm, usually 100–200 ppm, of soluble lead. Of this about 10–15 percent is organic lead and 85–90 percent is inorganic lead. Where desired, further reduction of the soluble inorganic lead content of the treated effluent can be effected by simply adjusting the pH of the treated effluent to 8 to 9.5 in the presence of water-soluble carbonates as described in Canadian Pat. 572,192.

In the following examples which further illustrate the invention, the parts given are on a weight basis unless otherwise stated.

EXAMPLE 1

To an agitated equimolar mixture of tetraethyl lead and tetramethyl lead (the tetramethyl lead is introduced as 80 percent solution in toluene), 0.3 weight percent of boron trifluoride diethyl etherate, based on the weight of the alkyllead, is added. The reaction is carried out at room temperature. After five minutes, the reaction mixture is washed with alkaline solution (1 percent aqueous sodium hydroxide) to remove the catalyst. The washed mixture of alkylleads is then blended in the usual manner with a requisite amount of ethylenedibromide and/or ethylenedichloride, antioxidants and dye.

Analysis of the redistributed mixture was found to be as follows:

| Tetraalkyllead: | Mol percent |
|---|---|
| Tetramethyl | 4.2 |
| Trimethylethyl | 24.6 |
| Dimethyldiethyl | 42.4 |
| Methyltriethyl | 24.4 |
| Tetraethyl | 4.4 |

Redistribution may be carried out in the ethylenedibromide and/or the ethylenedichloride normally present in the commercial antiknock blends.

EXAMPLE 2

6700 Parts aqueous effluent from Example 1 produced, by washing the reaction mixture with 1% aqueous sodium hydroxide was charged in a stream still. This effluent contained 0.4 percent residual sodium hydroxide, the reaction products of the catalyst with sodium hydroxide and 27,700 ppm dissolved lead, 89 percent of which was organic lead essentially as a mixture of $(CH_3)_n(C_2H_5)_{3-n}Pb^+$ ions in which $n$ is 0, 1, 2 or 3 and 11 percent of which was divalent inorganic lead. Ten parts sodium carbonate were added to anticipate a final reacted pH of about 7. 45 Parts chopped aluminum foil were added.

The charge was heated to the boil by steam injection and then steam-distilled until no more water-immiscible condensate formed. About 1½ hours' steam distallation was required. 213 Parts water-immiscible condensate was recovered consisting essentially of tetra (mixed ethyl and methyl) compounds as $(CH_3)_n(C_2H_5)_{4-n}Pb$. The undistilled effluent from steam distillation contained 190 ppm dissolved lead, 10 percent of which was organic lead and 90 percent of which was inorganic lead. The organic lead was therefore reduced from 24,600 ppm to 19 ppm.

EXAMPLE 3

Two hundred mls of caustic wash used to treat the tetraethyllead reaction product of sodium lead alloy and ethyl chloride was treated with 6 g. of NaOH and 3 grams zinc (20 mesh), which had been washed with 20 mls of $HgCl_{20}$% HCl containing 0.3 g. of 61 2. After 30 minutes agitation at room temperature, the dissolved organic lead, $Et_3Pb^+$, content had decreased from 7.8 percent (43,800 ppm of Pb) to 4.5 percent (25,200 ppm of Pb) and the dissolved inorganic lead, $Pb^{++}$, decreased from 0.4 percent to 0.1 percent. The temperature of the mixture was raised to 45° C. by the use of a hot water bath, and agitated for 45 minutes. The residual zinc was filtered off, and the organic phase and aqueous plate separated. The organic phase contained 3.27 wt. percent hexaethyldilead by polarography and 96.44 percent iodine titratables calculated as tetraethyllead (TEL) and corrected for hexaethyldilead. The aqueous phase contained 20 ppm of dissolved $Et_3Pb^+$ (corresponding to 14 ppm of organic lead), 0.03% $Pb^{++}$, and 0.2% $Zn^{++}$.

EXAMPLE 4

Two hundred mls of caustic wash (0.45% $Pb^{++}$, 7.05% $Et_3Pb^+$) used to treat the tetraethyllead reaction product of ethyl chloride and sodium lead alloy, 6 grams NaOH and 2 grams of aluminum foil were mixed together (with agitation) for 60 minutes at 30° C. The aqueous phase contained 0.36% $Pb^{++}$ and 2.14% $Et_3Pb^+$ and the organic phase contained 57.44 percent hexaethyldilead and iodine titratables calculated as TEL of 46.80 percent (corrected for the hexaethyldilead content). The dissolved organic lead content was reduced from 49,500 ppm to 15,100 ppm.

EXAMPLE 5

Two hundred fifty milliteters of effluent water from the tetraethyllead process with a pH of 11.2 and containing 9 ppm lead (90 percent as organic lead, tri[mixed $C_1$ and $C_2$ alkyl]lead, and 10 percent inorganic lead as $Pb^{++}$) were passed at 10 milliliters per minute through a column of No. 40 mesh iron filings 3 centimeters in diameter and 13 centimeters deep. The effluent water had a contact time of 9.2 minutes with the column of iron. The effluent water after the iron contact contained no organic phase and a maximum lead content of 0.2 ppm, thereby showing a greater than 97 percent reduction of lead content.

The foregoing detailed description has been given for clarity of understanding only and no unnecessary limitations are to be understood therefrom. The invention is not limited to exact details shown and described for obvious modifications will occur to one skilled in the art.

What is claimed is:

1. A process for reducing the dissolved organic lead content of aqueous effluents from the manufacture of alkyllead compounds which comprises:
   A. contacting said aqueous effluents with a metal more electropositive than lead but essentially non-reactive with water until the dissolved organic lead is converted into an insoluble lead containing product and
   B. separating the insoluble lead containing product from the aqueous effluent.

2. The process of claim 1 wherein the metal is selected from the group consisting of iron, zinc, aluminum and magnesium.

3. The process of claim 1 wherein the effluent being contacted has a pH of 8 to 13.

4. The process of claim 1 wherein the metal is zinc.

5. The process of claim 1 wherein the effluent is from a process for making tetra (mixed alkyl) lead by redistributing the alkyl groups of a mixture of tetra-methyllead and tetraethyllead.

6. The process of claim 1 wherein the metal is aluminum.

7. The process of claim 1 wherein the metal is iron.

* * * * *